US012001370B2

(12) United States Patent
Taylor (10) Patent No.: US 12,001,370 B2
(45) Date of Patent: Jun. 4, 2024

(54) MULTI-NODE MEMORY ADDRESS SPACE FOR PCIe DEVICES

(71) Applicant: Advanced Micro Devices, Inc., Santa Clara, CA (US)

(72) Inventor: Brock A. Taylor, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/565,601

(22) Filed: Dec. 30, 2021

(65) Prior Publication Data

US 2023/0214345 A1 Jul. 6, 2023

(51) Int. Cl.
*G06F 13/40* (2006.01)
*G06F 12/02* (2006.01)
*G06F 13/16* (2006.01)
*G06F 13/42* (2006.01)

(52) U.S. Cl.
CPC ...... *G06F 13/4221* (2013.01); *G06F 12/0238* (2013.01); *G06F 13/1668* (2013.01); *G06F 13/404* (2013.01); *G06F 2213/0026* (2013.01)

(58) Field of Classification Search
CPC ............. G06F 13/4221; G06F 13/1668; G06F 13/404; G06F 12/0238; G06F 2213/0026
USPC ........................................................ 710/313
See application file for complete search history.

(56) References Cited

U.S. PATENT DOCUMENTS

| 9,223,737 | B1* | 12/2015 | Serebrin | G06F 13/404 |
| 10,452,279 | B1* | 10/2019 | Malwankar | G06F 3/0659 |
| 10,853,541 | B1* | 12/2020 | Joshi | G06F 30/327 |
| 11,055,190 | B1* | 7/2021 | Li | G06F 3/065 |
| 11,734,192 | B2* | 8/2023 | Johns | G06F 12/1036 |
| | | | | 711/207 |
| 2006/0126612 | A1* | 6/2006 | Sandy | H04L 69/16 |
| | | | | 370/466 |
| 2015/0012714 | A1* | 1/2015 | Yuan | G06F 12/0831 |
| | | | | 711/147 |
| 2015/0026384 | A1* | 1/2015 | Maitra | G06F 12/1081 |
| | | | | 710/313 |
| 2015/0127878 | A1* | 5/2015 | Regula | G06F 13/4221 |
| | | | | 710/316 |
| 2017/0147456 | A1* | 5/2017 | Lee | G06F 11/2033 |
| 2020/0301873 | A1* | 9/2020 | Borikar | G06F 13/4022 |

* cited by examiner

*Primary Examiner* — Christopher B Shin
(74) *Attorney, Agent, or Firm* — Volpe Koenig (57) ABSTRACT

A device in an interconnect network is provided. The device comprises an end point processor comprising end point memory and an interconnect network link in communication with an interconnect network switch. The device is configured to issue, by the end point processor, a request to send data from the end point memory to other end point memory of another end point processor of another device in the interconnect network and provide, to the interconnect network switch, the request using memory addresses from a global memory address map which comprises a first global memory address range for the end point processor and a second global memory address range for the other end point processor.

20 Claims, 6 Drawing Sheets

| GPU 1-A Mem Addr | GPU 1-B Mem Addr | GPU 1-C Mem Addr | GPU 2-A Mem Addr | GPU 2-B Mem Addr | GPU 2-C Mem Addr | ... | GPU N-A Mem Addr | GPU N-B Mem Addr | GPU N-C Mem Addr |
|---|---|---|---|---|---|---|---|---|---|
| hostname1 | | | hostname2 | | | ... | hostnameN | | |
| Device 1 aperture | | | Device 2 aperture | | | ... | Device N aperture | | |

MULTI-NODE MEMORY ADDRESS SPACE FOR PCIe DEVICES

BACKGROUND

An interconnect network includes different devices (e.g., computers, mobile devices and servers) which are interconnected to each other via a network. Peripheral Component Interconnect Express (PCIe) is an expansion bus standard for high bandwidth communication between the internal hardware (e.g., CPU and RAM (e.g., main memory)) of a device of an interconnect network and endpoint devices (e.g., graphics devices, Ethernet devices and USB devices) of the device in communication with the internal hardware.

PCIe architecture of each device in a PCIe network includes a root complex (e.g., a root point device) which includes root points or root ports. The root complex connects the CPU and main memory to endpoint devices via one or more internal switch devices. The root complex generates transaction requests on behalf of the CPU, which is interconnected through a local bus.

BRIEF DESCRIPTION OF THE DRAWINGS

A more detailed understanding can be had from the following description, given by way of example in conjunction with the accompanying drawings wherein.

DETAILED DESCRIPTION

As used herein, a program includes any sequence of instructions (e.g., an application, a module, a kernel, a work item, a group of work items and the like) to be executed using one or more processors to perform procedures or routines (e.g., operations, computations, functions, processes and jobs). Processing of programmed instructions includes one or more of a plurality of processing stages, such as but not limited to fetching, decoding, scheduling for execution and executing the programmed instructions. Processing of programmed instructions includes, but is not limited to sampling data, encoding data, compressing data, reading and writing data, storing data, converting data to different formats, performing calculations, controlling one or more other components to process data and transmitting data (e.g., within a device in an interconnect network and to other devices in the interconnect network, such as a PCIe network).

Direct memory access (DMA) is a technique which allows different endpoint devices, (e.g., endpoint processors, such as GPUs or GPU cores) of a device in an interconnect network to access main memory. Remote Direct Memory Access (RDMA) allows two or more different devices of an interconnect network to exchange data in main memory of the different devices without involving the operating systems of the devices. RDMA improves throughput and performance because it allows a device in an interconnect network to access main memory of another device in an interconnect network while freeing up resources (e.g., processor, cache or operating system of the device) to perform other tasks. In addition, RDMA facilitates faster data transfer and lower latency for data requests between devices of the interconnect network.

However, conventional devices of an interconnect network are unable to perform DMA for internode communications over the network (e.g., GPU of one device in the network to a GPU of another device in the network). When data is sent from a component of an endpoint processor (e.g., GPU) of a device in the network to another endpoint processor (e.g., another GPU) of another device in the network, the transactions are serviced by using network fabric and a buffer (e.g., bounce buffer) requiring CPU interaction or by using slower input-output memory management unit (IOMMU) functions to move the data and service the requests. That is, when data is requested to be sent from a GPU of a first device on a network to a GPU of a second device on the network, the fabric driver of the first device copies data from GPU memory (e.g. via a bounce buffer) to its main memory. The data is then transmitted from the first device, over the network, to a bounce buffer at the second device. The fabric driver of the second device then copies the data from its bounce buffer to the destination GPU memory. These inter-device data transfer requirements add latency to the data transfer as well as interaction with the CPU to perform the data transfers.

Features of the present disclosure includes devices and methods which remove both the added latency of RDMA and the CPU interaction required to initiate the RDMA data transfers. Features of the present disclosure dynamically partition computing resources and enable less intrusive co-tenancy of workloads executing on GPUs and workloads executing on CPUs, which facilitates support for aggregation of compute resources with dynamic reconfiguration that does not require CPU and GPU interaction of the devices in the network.

Features of the present disclosure provide a global memory address map which includes information (e.g., identification and address information) used to configure devices of a PCIe network to execute inter-node communications (e.g., data transfers) using DMA. The information in the global memory address map includes information which identifies the devices in the interconnect network and components (e.g., endpoint processors and corresponding endpoint memory portions) of the devices in the network to create an aggregated memory address map of the devices.

The global memory address map comprises a non-overlapping memory address space (i.e., non-overlapping memory address ranges for each endpoint memory portion) at the devices in the interconnect network (e.g., PCIe network). Addressable memory ranges for each device (e.g., memory addresses of endpoint devices in each device) in the network are coordinated and aggregated into the global memory address map.

Features of the present disclosure define the format (e.g., table format) of the global memory address map that is used by the local PCIe switches of the devices to enable DMA operations without the use of buffers (e.g., bounce buffers)

or IOMMU transactions. Accordingly, features of the present disclosure improve the performance (e.g., reduced latency and less power consumed) over conventional PCIe devices and PCIe networks.

The global memory address map at a device in the network is used by drivers (e.g., instructions which control access to endpoint devices) of the device such that inter-device communications from endpoint devices of other devices are routed to destination endpoint processors of the devices in the network without the use of buffers (e.g., bounce buffers) or IOMMU transactions. For example, the global memory address map permits local DMA for communications within a device using PCI hierarchy.

The global memory address map also provides for RDMA over an interconnect network (i.e., via a network switch, such as for example a PCIe network switch). The information in the global memory address map is provided to the PCIe network switch such that the data from an endpoint processor (i.e., endpoint processor memory) of a device is routed to another device identified by the information (i.e., global address) in the memory access request as the destination device. The data is then routed to the destination endpoint processor (i.e., destination endpoint processor memory) of the other device using the global memory address map at the other device.

A device in an interconnect network is provided. The device comprises an end point processor comprising end point memory and an interconnect network link in communication with an interconnect network switch. The device is configured to issue, by the end point processor, a request to send data from the end point memory to other end point memory of another end point processor of another device in the interconnect network and provide, to the interconnect network switch, the request using memory addresses from a global memory address map which comprises a first global memory address range for the end point processor and a second global memory address range for the other end point processor.

A method for accessing memory in an interconnect network is provided. The method comprises issuing, by an end point processor of a first device in the interconnect network, a request to send data from end point memory of the end point processor to other end point memory of another end point processor of a second device in communication with the first device via an interconnect network switch and providing, to the interconnect network switch, the request using memory addresses from a global memory address map which comprises a first global memory address range for the end point processor of the first device and a second global memory address range for the other end point processor of the second device.

An interconnect network is provided which comprises an interconnect network switch, a first device and a second device. The first device comprises a first end point processor comprising first end point memory and a first interconnect network link in communication with the interconnect network switch. The second device comprises a second end point processor comprising second end point memory and a second interconnect link in communication with the interconnect network switch. The first device is configured to issue, by the first end point processor, a request to send data from the first end point memory to the second end point memory and provide, to the interconnect network switch, the request using memory addresses from a global memory address map which comprises a first global memory address range for the first end point processor and a second global memory address range for the second end point processor.

Figure 1:
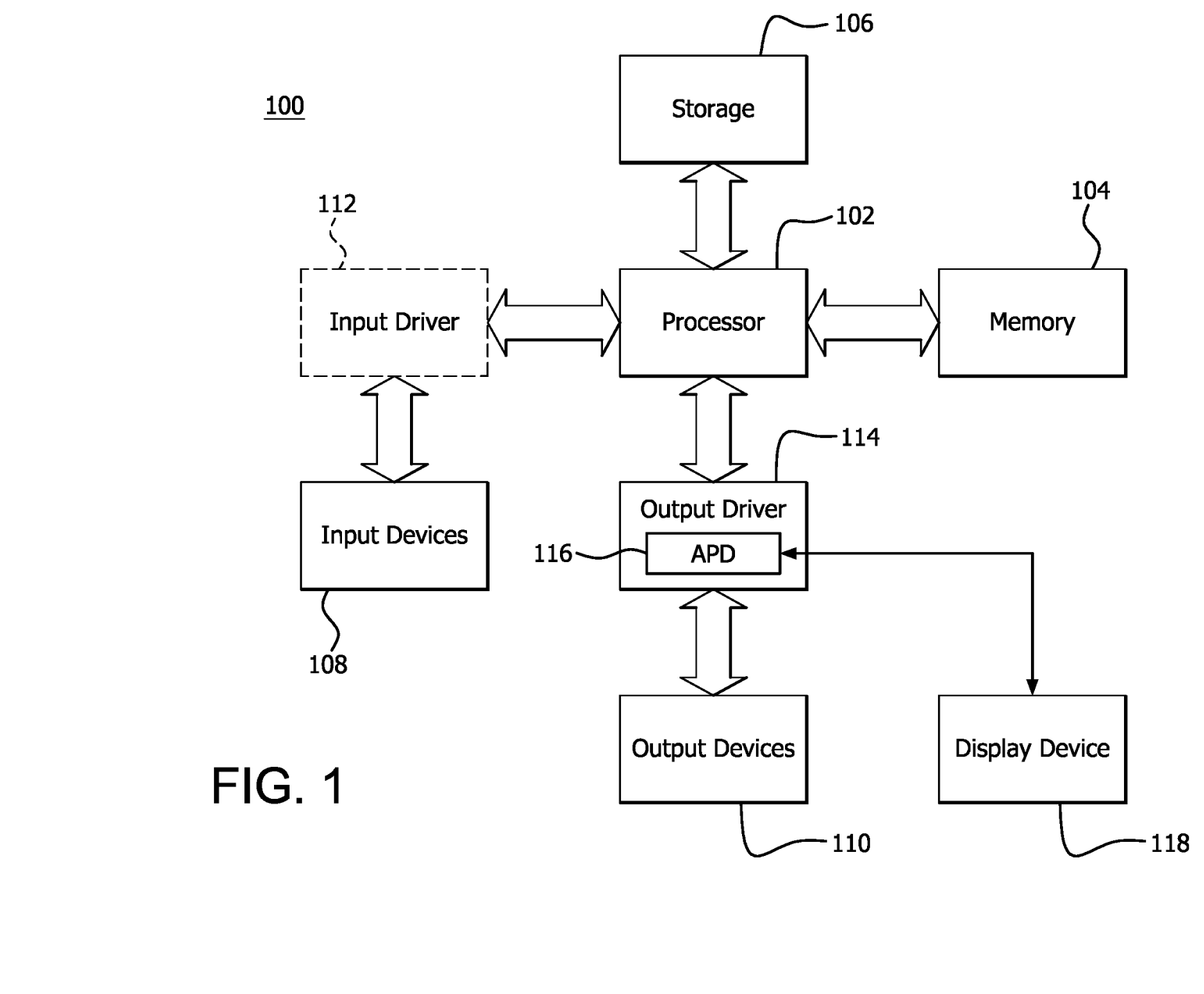
FIG. 1 is a block diagram of an example device in which one or more features of the present disclosure can be implemented.
Figure 2:
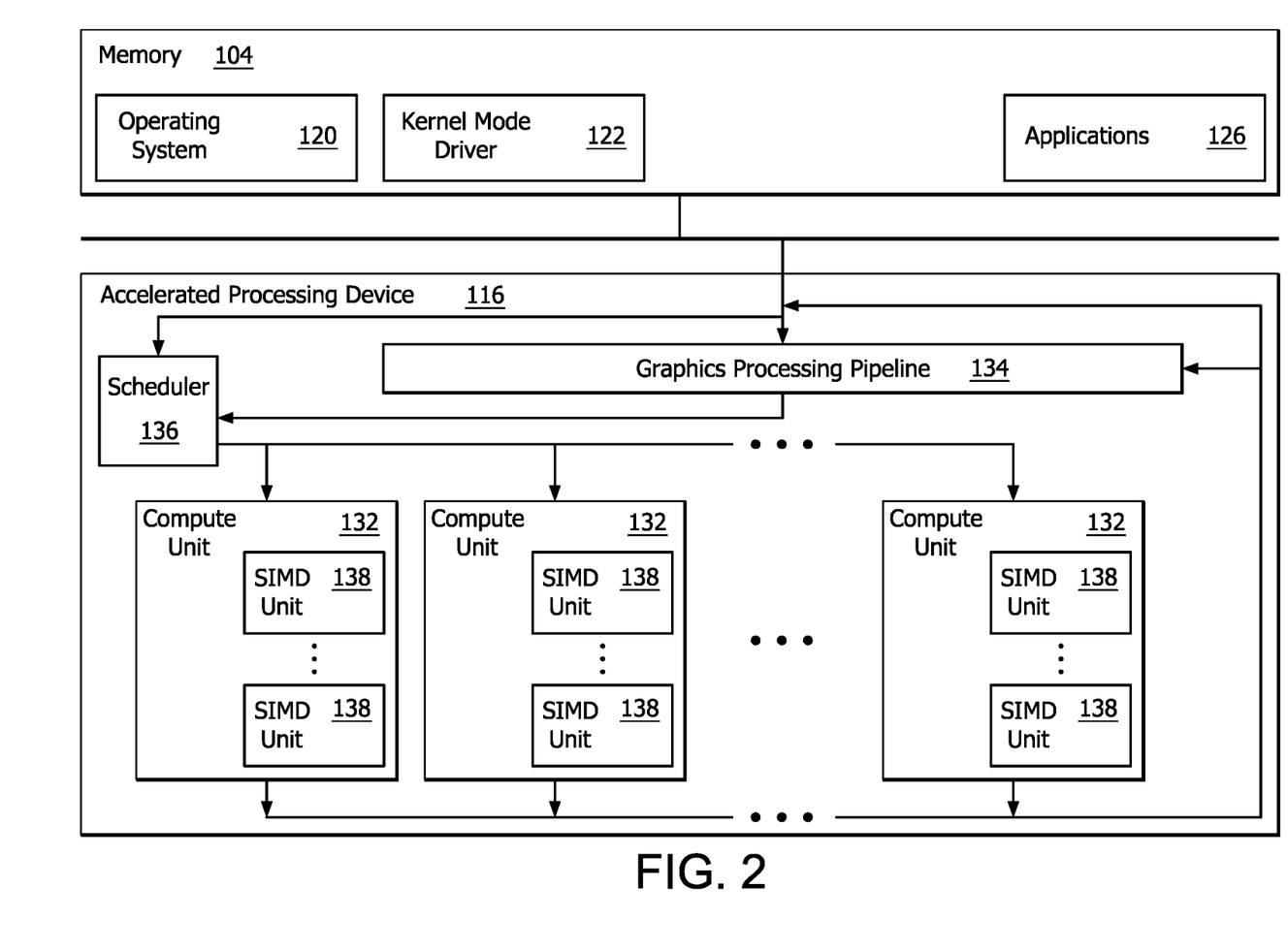
FIG. 2 is a block diagram illustrating exemplary components of a device in which one or more features of the present disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, memory 104, storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes one or more processors, such as a central processing unit (CPU), a graphics processing unit (GPU), or another type of compute accelerator, a CPU and GPU located on the same die, or one or more processor cores, wherein each processor core can be a CPU or a GPU or another type of accelerator. Multiple processors are, for example, included on a single board or multiple boards. Processor on one or more boards. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, one or more image capture devices (e.g., cameras), a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, one or more serial digital interface (SDI) cards, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The input driver 112 and the output driver 114 include, for example, one or more video capture devices, such as a video capture card (e.g., an SDI card). As shown in FIG. 1, the input driver 112 and the output driver 114 are separate driver devices. Alternatively, the input driver 112 and the output driver 114 are integrated as a single device (e.g., an SDI card), which receives captured image data and provides processed image data (e.g., panoramic stitched image data) that is stored (e.g., in storage 106), displayed (e.g., via display device 118) or transmitted (e.g., via a wireless network).

It is noted that the input driver 112 and the output driver 114 are optional components, and that the device 100 will operate in the same manner if the input driver 112 and the output driver 114 are not present. In an example, as shown in FIG. 1, the output driver 114 includes an accelerated processing device ("APD") 116 which is coupled to the display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 3:
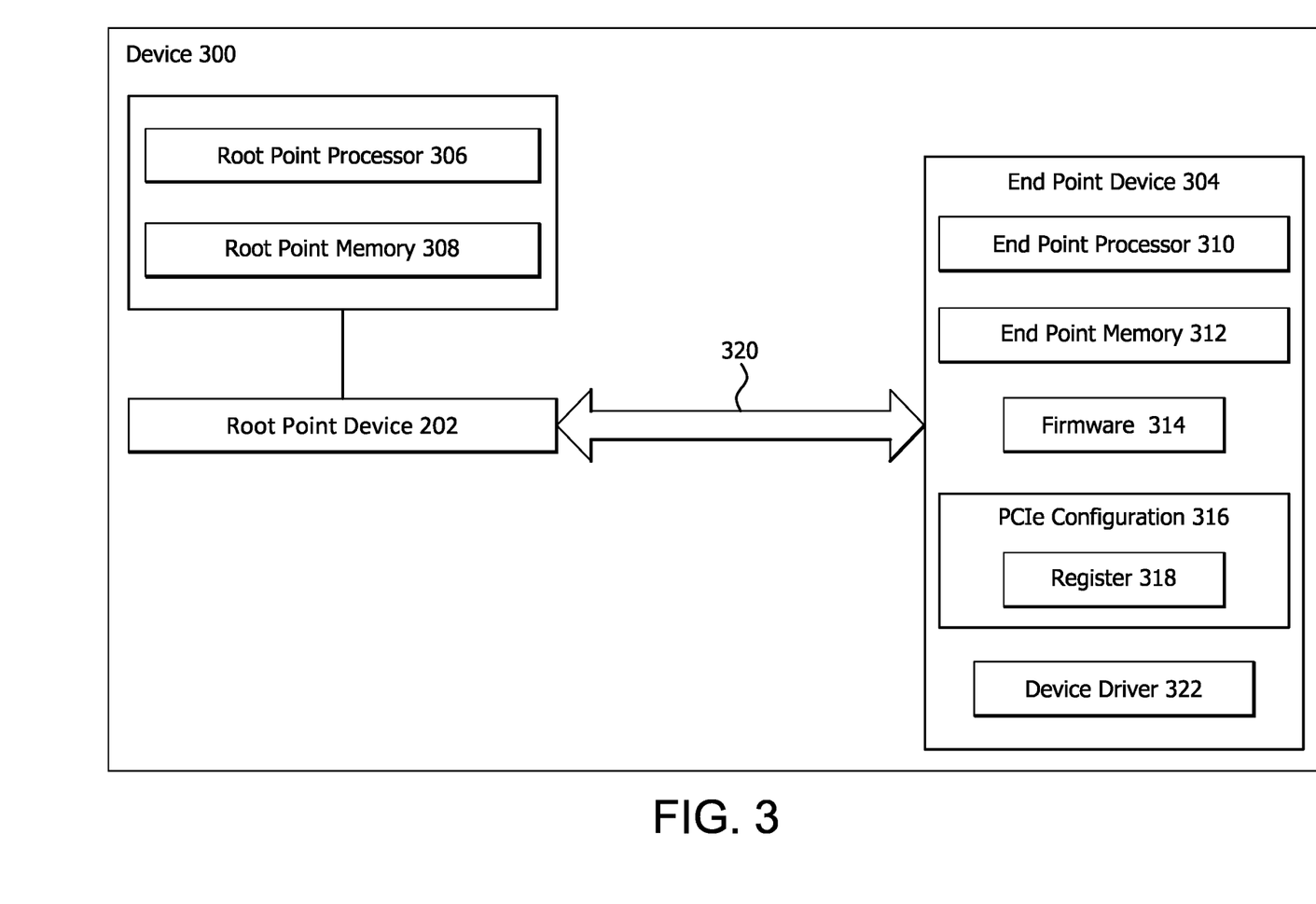
FIG. 3 is a block diagram illustrating example components of a device of a PCIe network in which one or more features of the disclosure can be implemented.

FIG. 3 is a block diagram illustrating example components of a device 300 (e.g., one device in a network) of a PCIe network in which one or more features of the disclosure can be implemented.

As shown in FIG. 3, device 300 includes a root point device 302, an end point device 304 and a PCIe link 320. PCIe link 320 is a point-to-point (e.g., end point to root point) communication channel, which includes one or more lanes for allowing root point device 302 and end point device 304 to communicate PCIe traffic between each other. PCIe traffic includes any data sent across the PCIe link, such as messages, which include memory access requests (e.g., read and write access requests), LTR reporting values and interrupts. PCIE traffic includes, for example, DMA (reading data from memory data and writing data to memory) between local memory (e.g., end point memory) and root point memory (e.g., main memory).

The root point device 302 is, for example, a root complex which includes a plurality of root points (e.g., root ports) each connecting the internal hardware, such as a root point processor 306 (e.g., CPU) and root point memory (e.g., main memory) 308, to a plurality of end point devices, such as end point device via PCIe link 320. For simplified explanation, FIG. 3 shows the root point device 302 connected to a single endpoint device 304 via PCIe link 320.

End point device 304 is, for example, a peripheral hardware device (e.g., graphics device, Ethernet device or USB device) which communicates with the root point processor 306 and the root point memory 308 via the PCIe link 320. The end point device 304 includes end point processor 310, end point memory 312, firmware 314 and PCIe configuration (e.g., PCIe configuration instructions) 316.

End point processor 310 is, for example, APD 116 (e.g., a GPU) shown in FIG. 1. End point processor 310 is configured to perform a plurality of functions, such as executing instructions to control operation of the end point device 304, sending messages over PCIe link 320 to a CPU core 306 of the root point device 302 which includes, for example, a request (read request, write request) to access the root point memory 308 (e.g., main memory).

Firmware 314 is used to store instructions for a plurality of program portion types (e.g., workload types to control operation of the endpoint device 304 and provide an interface between the hardware (e.g., processor 310 and memory 312) of the end point device 304 and device driver 322.

Register 318 of PCIe configuration space 316 represents a set of registers used to map the endpoint device 304 to memory addresses (e.g., mapping endpoint device 304 to I/O port address space or memory-mapped address space). Base Address Registers (BARs) are programmed by firmware 314 (e.g. BIOS) or the operating system of the device 300 to inform the device 300 of its resource configuration by writing configuration commands to a PCI controller. PCIe buses are enumerate to determine which PCI slots have devices (e.g., endpoint device 304).

Figure 4:
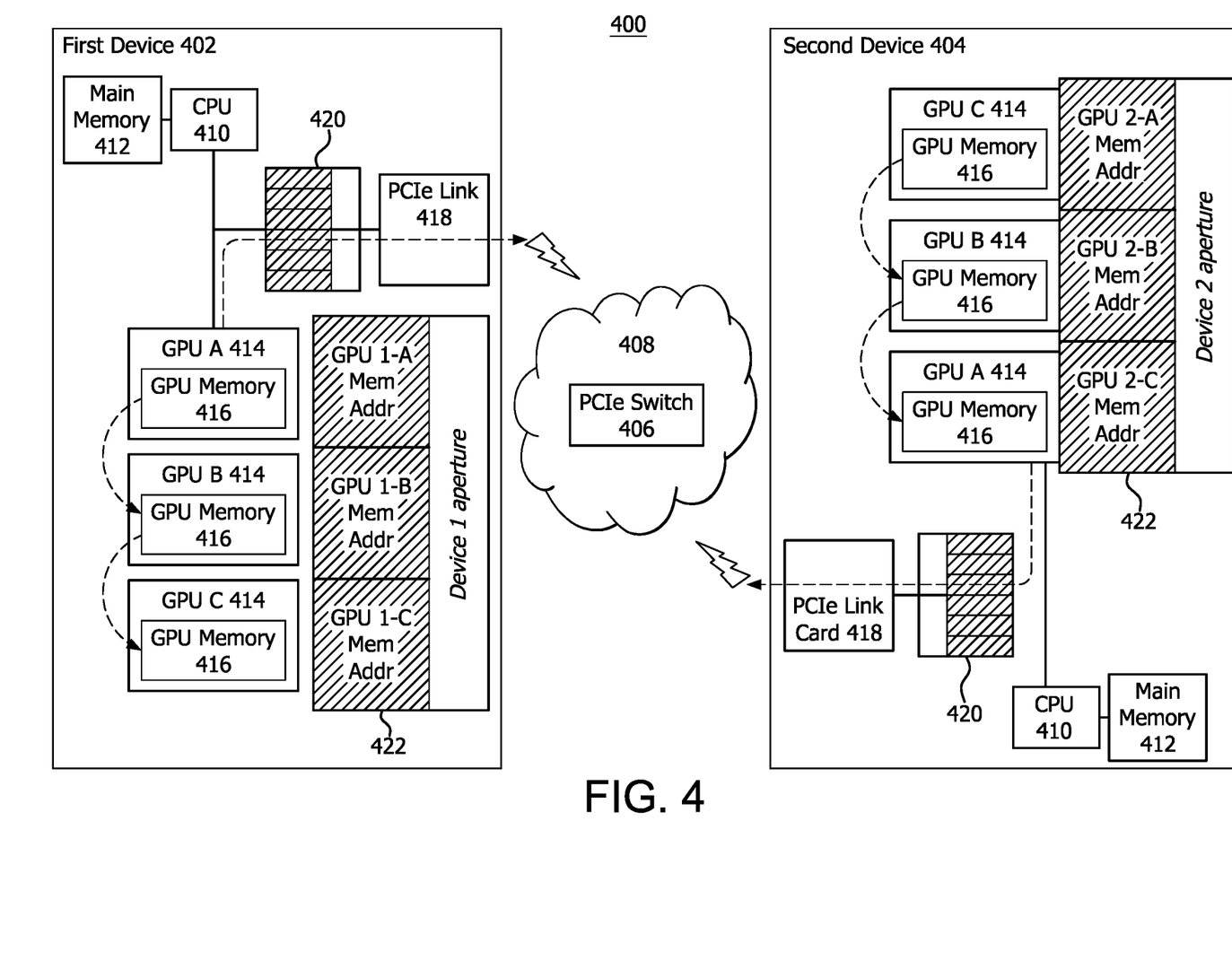
FIG. 4 is a block diagram illustrating an example of an interconnect network in which one or more features of the disclosure can be implemented.

FIG. 4 is a block diagram illustrating an example of a PCIe network 400 in which one or more features of the disclosure can be implemented. The PCIe network 400 shown in FIG. 4 is merely an example of a type of interconnect network. Features of the disclosure can be implemented for any interconnect network comprising interconnected network devices.

As shown in FIG. 4, PCIe network 400 comprises a first device 402 and a second device 404, and a PCIe network switch 406 used to route communications between first and second devices 402 and 404 over network 408. For simplification purposes, two devices are shown in the example interconnect network 400 in FIG. 4. Features of the present disclosure can be implemented for interconnect networks comprising a number of devices different than the number of devices shown in FIG. 4.

As shown in FIG. 4, each device 402 and 404 includes a CPU 410, main memory 412 and three GPUs 414. The first device 402 includes a first GPU A, a second GPU B and a third GPU C. For simplification purposes, three GPUs 414 are shown as the endpoint devices for each device 402 and 404 in the example PCIe network 400. Features of the present disclosure can be implemented for interconnect networks comprising a number of endpoint devices (e.g., GPUs) different than the number of endpoint devices shown in FIG. 4. Each GPU 414 includes its own memory portion 416 (e.g., endpoint memory). Each device 402 and 404 also includes a PCIe link 418 (e.g., PCIe link card), a global memory address map 420 and a local address space 422 comprising local addresses (e.g., GPU memory addresses) and a device aperture used in the global memory address map 420.

For example, as shown in FIG. 4, the local address space 422 of the first device 402 includes a first memory address range for GPU A (GPU 1-A Mem Addr), a second memory address range for GPU B (GPU 1-B Mem Addr) and a third memory address range for GPU C (GPU 1-C Mem Addr). The local address space 422 of the first device 402 also includes device 1 aperture. Likewise, the local address space 422 of the second device 404 includes a first memory address range for GPU A (GPU 2-A Mem Addr), a second memory address range for GPU B (GPU 2-B Mem Addr) and a third memory address range for GPU C (GPU 2-C Mem Addr). The local address space 422 of the second device 402 also includes device 2 aperture.

As described below, the memory addresses for each GPU 414 in the local address space 422 are mapped to a non-overlapping global address range using the corresponding device aperture. That is, the memory addresses for each GPU 414 are mapped to a non-overlapping global address range that is unique to each corresponding GPU 414 in the PCIe network 400.

The global memory address map 420 includes information identifying the global addresses of the devices (e.g., devices 402 and 404) in the PCIe network 400, and global address ranges of endpoint devices (e.g., GPUs 414) of the PCIe network. Each device of the same type in the PCIe network 400 (e.g., each GPU 414 of the PCIe network 400) is mapped to a common global address range identified in the global memory address map 420.

Figure 5:
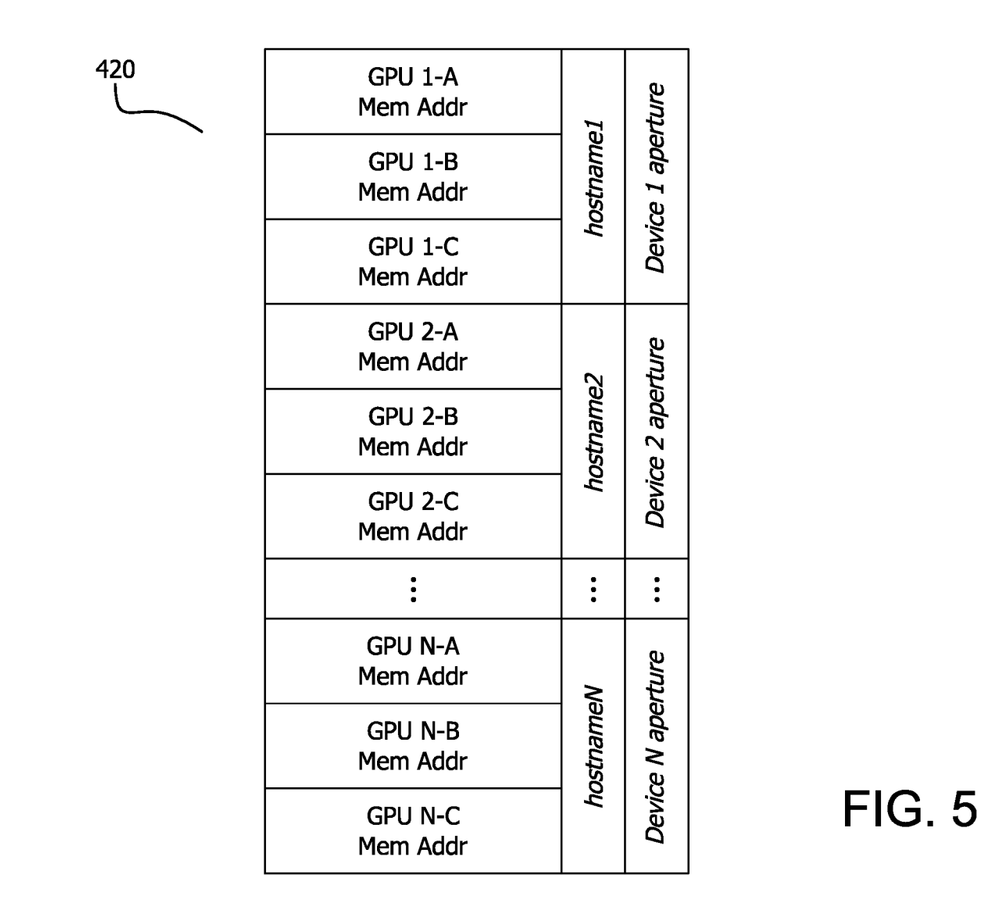
FIG. 5 is a block diagram illustrating an example global memory address map for implementing one or more features of the present disclosure.

FIG. 5 is a block diagram illustrating a more detailed example of the global memory address map 420 shown in FIG. 4 for implementing one or more features of the present disclosure. The example global memory address map 420 shown in FIG. 5 includes global memory addresses for N number of devices (e.g., devices 300, 402 and 404) and memory addresses (Mem Addr) for each GPUs 414.

In the example shown in FIG. 5, each device includes three GPUs 14. However, features of the present disclosure can be implemented, for any number of endpoint devices or endpoint processors (e.g., GPUs) different than the number of GPUs shown in FIG. 5. In addition, for simplification purposes, FIG. 5 illustrates a GPU as an example of an endpoint processor. Features of the present disclosure can be implemented for other types of endpoint devices and endpoint processors and their corresponding portions of memory.

The global memory address map 420 shown in FIG. 5 identifies each GPUs 414 as belonging to a device in the PCIe network 400. For example, the mapping for global address GPU 1-A includes an identifier (hostname 1) which identifies a first GPU A as belonging to the first device 402, the mapping for global address GPU 1-B includes the identifier (hostname 1) which identifies a second GPU B as belonging to the first device 402 and the mapping for global address GPU 1-C includes the identifier (hostname 1) which identifies a third GPU C as belonging to the first device 402. The mapping for global address GPU 2-A includes an identifier (hostname 2) which identifies a first GPU A as belonging to the second device 404, the mapping for global address GPU 2-B includes the identifier (hostname 2) which identifies a second GPU B as belonging to the second device 404 and the mapping for global address GPU 2-C includes the identifier (hostname 2) which identifies a third GPU C as belonging to the second device 404. The mapping for global address GPU N-A includes an identifier (hostname N) which identifies a first GPU A as belonging to an Nth device, the mapping for global address GPU N-B includes the identifier (hostname N) which identifies a second GPU B as belonging to the Nth device and the mapping for global address GPU N-C includes the identifier (hostname N) which identifies a third GPU C as belonging to the Nth device.

The global memory address map 420 shown in FIG. 5 also includes the device aperture (e.g., device 1 aperture and device 2 aperture shown in the local address spaces 422 in FIG. 4) for each device. For example, as shown in FIG. 5, a first device (identified by hostname 1) includes device 1 aperture, a second device (identified by hostname 2) includes device 2 aperture and the Nth device (identified by hostname N) includes device N aperture. Each device aperture enables local memory operations (i.e., conventional read and write operations used for inter-device data transfers) of the device to be skipped. Instead, the global memory address map 420 is used to translate the addresses of the skipped local memory operations and map the memory addresses for each GPU 414 in the local address space 422 to a non-overlapping global address range. Accordingly, additional latency and interaction with other inter-device components (e.g., CPU) which accompany such local memory operations are avoided.

In addition, the memory addresses (Mem Addr) of the GPUs 414 shown in the global memory address map 420 at FIG. 5 are mapped to a non-overlapping global address range. That is, the memory addresses (Mem Addr) of the GPUs 414 are mapped to a global address range that is unique for each GPU 414 in the network 400 (i.e., each GPU has its own unique address space in the global address map). The global address range is, for example, unique with respect to other types of endpoint devices (non-GPUs). For example, the global memory for GPU 1-A through GPU N-C in the global memory address map 420 are addresses in a continuous address range. Alternatively, the memory addresses of the different GPUs 414 can be mapped to non-continuous global address ranges. The global memory address map 420 also includes the global memory addresses (e.g., address ranges) of the other remaining devices (e.g., remote devices, such as second device 404) of the PCIe network 400.

The global memory address map 420 is used by drivers (e.g., input driver 112 and output driver 114 and device driver 34) of the devices 402 and 404 such that inter-node communications (e.g., data transfer between GPUs 414 of devices 402 and 404) are routed to the correct destinations without the use of buffers (e.g., bounce buffers) or IOMMU transactions. The global memory address map 420 permits local DMA for communications within a device using the PCI hierarchy.

The global memory address map 420 also provides for RDMA over the PCI network 408 via the network switch 406. The information in the global memory address map is provided to the PCIe network switch such that the data from an endpoint processor (i.e., endpoint processor memory) of a device is routed to another device identified by the information (i.e., global address) in the memory access request as the destination device. The data is then routed to the destination endpoint processor (i.e., destination endpoint processor memory) of the other device using the global memory address map at the other device.

Each device 402 and 404 also includes a local address space for a group of endpoint processors of a same type (e.g., GPUs). For example, as shown in FIG. 4, local memory address space 422 of the first processor 402 includes memory addresses for GPU A, GPU B and GPU C.

The PCIe switch 406 is configured to receive internode memory access requests (DMA requests), which include a global address identifying the destination device and a global destination endpoint processor address and route the DMA request to the device specified by the global mapping information. The information in the global memory address map 420 is provided to the PCIe network switch 406 such that the data from a GPU (e.g., GPU memory 416 of GPU A) of device 402 is routed to device 404. For example, when the PCIe switch 406 receives a DMA request from the first device 402 to send data from memory of GPU 414 of the first device to memory of a GPU 414 of the second device, the PCIe switch 406 routes the data to the destination as if the two GPUs were in the same device.

The PCIe link 418 is configured to receive the global memory addresses from the local address space 422 and map the remaining address ranges of other devices (e.g., second device 404 and other devices on the network), to provide the mapping shown in the global memory address map 420 shown in FIG. 5.

When a memory access request is received by the PCIe link 418 to send data from a GPU of the first device 402 to a GPU of the second device 404, the PCIe link 418 provides the mapping shown in the global memory address map 420 shown in FIG. 5 to PCIe network switch 406. The data is then routed to the second device 404 by the PCIe network switch 406. For example, PCIe switch 406 routes the data using transaction layer packets (TLPs) between ports of devices 402 and 404.

When the PCIe link 418 of the second processor 404 receives the memory access request, the PCIe link 418 routes the data, using DMA, to the destination GPU 414 using the address in the GPU memory 416 specified in the global memory address map 420 at the second device 404. The DMA write to memory appears local to the GPU sending the data (e.g., the source GPU 414 at the first device 402). Because the global mapping in the global memory address map 420 maps each of the GPUs 414 on the of the PCIe network 400 to a common global address range, the second device 404 identifies the destination address as a GPU memory address and uses the local address space 422 to route the data to the correct memory address without.

In addition, the global mapping is determined once until there is a change in the PCIe hierarchy (e.g., change in the device bus enumeration).

Figure 6:
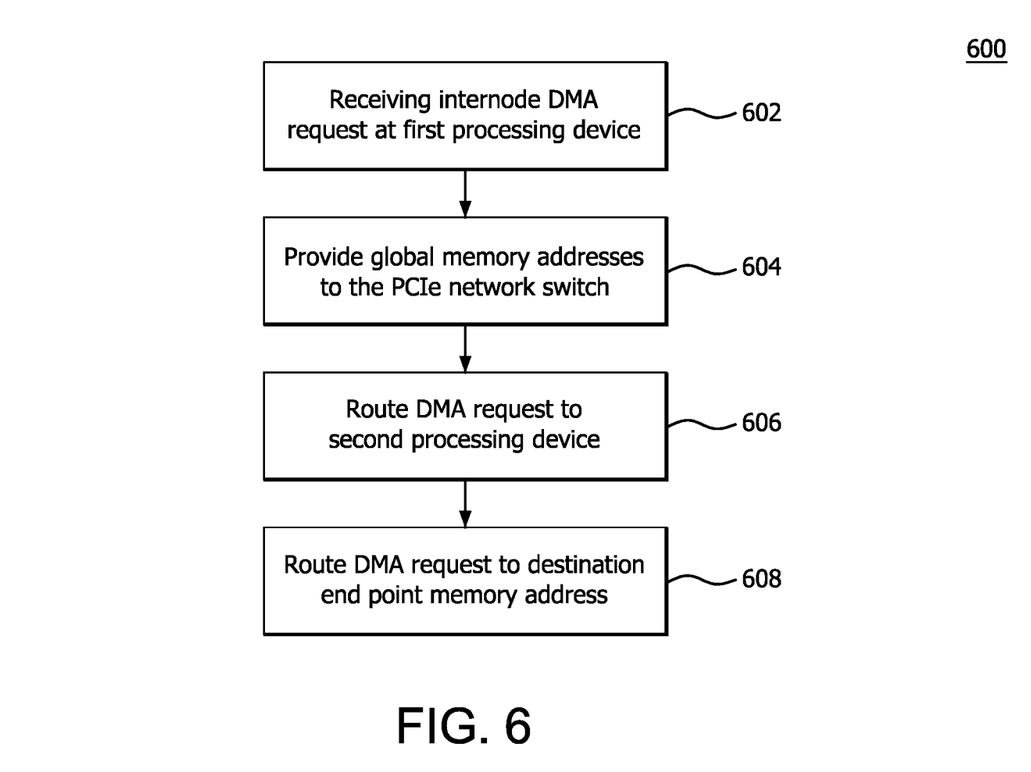
FIG. 6 is a flow chart illustrating an example method of internode communication of over an interconnect network according to features of the present disclosure.

FIG. 6 is a flow chart illustrating an example method 600 of inter-node communication of over a PCIe network according to features of the present disclosure.

Blocks 602 and 604 illustrate functions of the method 600 performed by a first device (i.e., source device) of the PCIe network writing data from memory of an endpoint processor (e.g., GPU memory) of the first device to memory of an endpoint processor of the same type (e.g., GPU memory) of another device (i.e., destination device) of the PCIe network. Block 606 illustrate functions of the method 600 performed by the destination device when the DMA request is received at the destination device.

As shown at block 602, the method 600 includes receiving an internode DMA request at a first device. For example, a DMA request (e.g., write request) is received at PCIe link 418 of a first device (e.g., device 402) to send data from a GPU (e.g., GPU 1-A) of the first device to a GPU 2-A of a second device (e.g., device 404).

As shown at block 604, the method 600 includes providing the global memory addresses to the PCIe network switch. For example, the PCIe link (e.g., PCIe link 418 of first device 402) uses the GPU memory addresses from the local address space (e.g., local address space 422 of first device 402) and the remaining GPU memory address ranges of the destination device (e.g., address for GPU 2-A) from the global memory address map 420 and provides the mapping information to the PCIe network switch (e.g., PCIe switch 406).

As shown at block 606 the method 600 includes routing the DMA request to the second device. For example, the PCIe network switch uses the global mapping provided by the first device to route the DMA request to the second device (e.g., second device 404) using the address identifying the second device 404 in the DMA request as the destination device. That is, the PCIe network switch receives the DMA request (e.g., to write data to an address in the global memory address map) from an endpoint device in the first device 402 (e.g., GPU 1-A of first device 402) and routes the DMA request to the second device 404 using an identifier in the global memory address map that identifies the second device (e.g., hostname 2 of global memory address map 420 in FIG. 4).

As shown at block 608, the method 600 includes routing the DMA request to the destination end point memory address. For example, when the DMA request to access GPU 2-A is received at the second device 404, the PCIe link routes the data, via DMA, to the memory address of the destination GPU 2-A using the address identified in the DMA request by the global memory address map 420 and the address specified in the local address space 420 at the second device 404. The data is routed to the destination GPU memory address without the use of buffers (e.g., bounce buffers) or IOMMU transactions. Accordingly, features of the overall performance is increased.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A device in an interconnected network, the device comprising:
   a plurality of end point processors each comprising end point memory;
   an interconnect network link in communication with an interconnect network switch; and
   a local address space comprising local addresses of the end point memory of each of the end point processors;
   the device configured to:
   issue, by an end point processor of the plurality of end point processors, a request to send data from the end point memory of the end point processor to end point memory of another end point processor of another device in the interconnect network; and
   provide, to the interconnect network switch, the request using memory addresses from a global memory address map which comprises information identifying the global addresses for the device and the other device and global memory address ranges for each of the plurality of end point processors of the device and each of a plurality of end point processors of the other device.

2. The device of claim 1, wherein the end point processor of the device is a first GPU and the other end point processor of the other device is a second GPU.

3. The device of claim 1 wherein the interconnect network is a peripheral component interconnect express (PCIe) network.

4. The device of claim 1, wherein the first global memory address range and the second global memory address range are non-overlapping address ranges.

5. The device of claim 1, wherein the end point processor and the other end point processor are a same processor type, and the first global memory address range and the second global memory address range are part of a continuous global address range for processors of the same processor type.

6. The device of claim 1, wherein the device is configured to map local addresses of the end point memory of the end point processor to the first global memory address range.

7. The device of claim 1, wherein the local address space comprises a device aperture and the device is further configured to map the local addresses of the end point memory of each end point processor of the device to a non-overlapping global address range using the corresponding device aperture.

8. The device of claim 1, wherein the device is configured to:
skip read and write operations used for inter-device data transfers; and
map local addresses of the end point memory to the first global memory address range by translating local addresses of the skipped read and write operations.

9. A method for accessing memory in an interconnect network, the method comprising:
issuing, by an end point processor of a plurality of end point processors of a first device in the interconnect network, a request to send data from end point memory of the end point processor to end point memory of another end point processor of a second device in communication with the first device via an interconnect network switch, wherein the first device comprises a local address space comprising local addresses of the end point memory of each of the plurality of end point processors; and
providing, to the interconnect network switch, the request using memory addresses from a global memory address map which comprises information identifying the global addresses for the first device and the second device and global memory address ranges for each of a plurality of end point processors of the first device and each of a plurality of end point processors of the second device.

10. The method of claim 9, wherein the end point processor of the first device is a first GPU and the other end point processor of the second device is a second GPU.

11. The method of claim 9, wherein the interconnect network is a peripheral component interconnect express (PCIe) network.

12. The method of claim 9, wherein the first global memory address range and the second global memory address range are non-overlapping address ranges.

13. The method of claim 9, wherein the end point processor and the other end point processor are a same processor type, and
the first global memory address range and the second global memory address range are part of a continuous global address range for processors of the same processor type.

14. The method of claim 9, further comprising mapping local addresses of the end point memory of each end point processor of the first device to the first global memory address range.

15. The method of claim 9, further comprising:
skipping read and write operations used for inter-device data transfers; and
mapping local addresses of the end point memory to the first global memory address range by translating the local addresses of the skipped read and write operations.

16. An interconnect network comprising:
an interconnect network switch;
a first device comprising:
a plurality of first end point processors each comprising first end point memory; and
a first interconnect network link in communication with the interconnect network switch; and
a first local address space comprising local addresses of the first end point memory of each of the plurality of first end point processors;
a second device comprising:
a plurality of second end point processors each comprising second end point memory; and
a second interconnect link in communication with the interconnect network switch; and
a second local address space comprising local addresses of the second end point memory of each of the plurality of second end point processors;
the first device configured to:
issue, by a first end point processor of the plurality of first end point processors, a request to send data from the first end point memory of the first end point processor to the second end point memory of a second end point processor of the plurality of second end point processors; and
provide, to the interconnect network switch, the request using memory addresses from a global memory address map which comprises information identifying the global addresses for the first device and the second device and global memory address ranges for each of the plurality of end point processors of the first device and the second device.

17. The interconnect network of claim 16, wherein the first end point processor of the first device is a first GPU and the second end point processor of the second device is a second GPU.

18. The interconnect network of claim 16, wherein the interconnect network is a peripheral component interconnect express (PCIe) network.

19. The interconnect network of claim 16, wherein the first global memory address range and the second global memory address range are non-overlapping address ranges.

20. The interconnect network of claim 16, wherein the interconnect network switch is configured to route the request to the second device using a global identifier, from the global memory address map, identifying the second device.

* * * * *